(12) United States Patent
Falko et al.

(10) Patent No.: US 10,475,271 B2
(45) Date of Patent: Nov. 12, 2019

(54) AUTHENTICATION OF PHYSICAL ENTITIES

(71) Applicant: Quantum Base Limited, Stockport (GB)

(72) Inventors: Vladimir Falko, Lancaster (GB); Robert Young, Lancaster (GB)

(73) Assignee: Quantum Base Limited, Stockport (GB)

( * ) Notice: Subject to any disclaimer, the term of this patent is extended or adjusted under 35 U.S.C. 154(b) by 0 days.

(21) Appl. No.: 15/546,968

(22) PCT Filed: Jan. 26, 2016

(86) PCT No.: PCT/GB2016/050164
§ 371 (c)(1),
(2) Date: Jul. 27, 2017

(87) PCT Pub. No.: WO2016/120608
PCT Pub. Date: Aug. 4, 2016

(65) Prior Publication Data
US 2018/0018846 A1    Jan. 18, 2018

(30) Foreign Application Priority Data

Jan. 27, 2015  (GB) .................. 1501342.8

(51) Int. Cl.
*G07D 7/202* (2016.01)
*G07D 7/12* (2016.01)
(Continued)

(52) U.S. Cl.
CPC .......... *G07D 7/205* (2013.01); *G06K 7/1417* (2013.01); *G06K 19/10* (2013.01);
(Continued)

(58) Field of Classification Search
CPC ........ G07D 7/205; G07D 7/12; G07D 7/2033; G06K 7/1417; G06K 19/10; G06Q 30/0185; B42D 25/29
See application file for complete search history.

(56) References Cited

U.S. PATENT DOCUMENTS 6,566,688 B1 *  5/2003  Zhang ................... B82Y 20/00
                                                257/85
9,058,535 B2 *  6/2015  Guigan ................ G07D 7/0006
(Continued)

FOREIGN PATENT DOCUMENTS

DE    102008034021 A1    1/2010
DE    102012201016 A1    7/2013

OTHER PUBLICATIONS

Crystallographic Defect, 2014, https://web.archive.org/web/20141013175111/https://en.wikipedia.org/wiki/Crystallographic_defect (Year: 2014).*
(Continued)

*Primary Examiner* — Daniel I Walsh
(74) *Attorney, Agent, or Firm* — Hoffman Warnick LLC

(57) ABSTRACT

An authentication device (20) comprises one or more flakes of a substantially two-dimensional material (14). The one or more flakes of the substantially two-dimensional material (14) have an operative area configured to emit, by non-resonant photoluminescence, electromagnetic radiation with a property that varies with position in the operative area.

46 Claims, 4 Drawing Sheets

(51) Int. Cl.
*G07D 7/2033* (2016.01)
*G06K 7/14* (2006.01)
*G06K 19/10* (2006.01)
*G06Q 30/00* (2012.01)
*B42D 25/29* (2014.01)

(52) U.S. Cl.
CPC .......... *G06Q 30/0185* (2013.01); *G07D 7/12* (2013.01); *G07D 7/2033* (2013.01); *B42D 25/29* (2014.10)

(56) References Cited

U.S. PATENT DOCUMENTS

| | | | | |
|---|---|---|---|---|
| 9,718,298 | B2* | 8/2017 | Lopez Quintela | B41M 3/144 |
| 9,878,913 | B2* | 1/2018 | Ramaprabhu | B82Y 30/00 |
| 9,926,202 | B2* | 3/2018 | Sundara | B82Y 30/00 |
| 10,086,334 | B2* | 10/2018 | Tour | C09K 11/65 |
| 10,213,746 | B2* | 2/2019 | Liu | B01D 65/108 |
| 2003/0031870 | A1* | 2/2003 | Argoitia | B41M 3/14 428/403 |
| 2003/0136837 | A1* | 7/2003 | Amon | G07D 7/04 235/435 |
| 2004/0218639 | A1* | 11/2004 | Oh | H01S 5/06256 372/20 |
| 2005/0156318 | A1* | 7/2005 | Douglas | B82Y 10/00 257/761 |
| 2005/0267345 | A1* | 12/2005 | Korgel | A61B 5/0059 600/317 |
| 2006/0033325 | A1* | 2/2006 | Maruvada | G11B 23/281 283/95 |
| 2007/0062411 | A1* | 3/2007 | Weisman | B82Y 25/00 106/31.15 |
| 2007/0080533 | A1* | 4/2007 | Bleikholm | B42D 25/29 283/72 |
| 2007/0082459 | A1* | 4/2007 | Faris | C12Q 1/6825 438/455 |
| 2007/0099310 | A1* | 5/2007 | Vepa | H01L 21/67288 438/4 |
| 2007/0148912 | A1* | 6/2007 | Morita | H01L 21/2007 438/455 |
| 2007/0221731 | A1* | 9/2007 | Ricci | G07D 7/04 235/462.01 |
| 2007/0257797 | A1* | 11/2007 | Rancien | G06K 19/025 340/572.1 |
| 2008/0260941 | A1* | 10/2008 | Jin | B01J 35/0013 427/126.4 |
| 2009/0026086 | A1* | 1/2009 | Zhamu | B82Y 30/00 205/555 |
| 2009/0074231 | A1* | 3/2009 | Rancien | D21H 21/40 382/100 |
| 2009/0258135 | A1* | 10/2009 | Kumar | G11C 13/00 427/122 |
| 2010/0110514 | A1* | 5/2010 | Houha | B29C 70/585 359/2 |
| 2010/0126660 | A1* | 5/2010 | O'Hara | B32B 37/12 156/249 |
| 2010/0200649 | A1* | 8/2010 | Callegari | G06K 19/086 235/375 |
| 2011/0204258 | A1* | 8/2011 | Heller | B82Y 15/00 250/459.1 |
| 2012/0068152 | A1* | 3/2012 | Hwang | H01L 29/78684 257/9 |
| 2012/0068154 | A1* | 3/2012 | Hwang | H01L 51/502 257/13 |
| 2012/0168506 | A1* | 7/2012 | Ruehrmair | G06F 21/73 235/454 |
| 2012/0265122 | A1* | 10/2012 | El-Shall | A61K 41/0052 604/20 |
| 2012/0279570 | A1* | 11/2012 | Li | C09C 1/44 136/263 |
| 2013/0032782 | A1* | 2/2013 | Gerasimos | B82Y 10/00 257/21 |
| 2013/0035567 | A1* | 2/2013 | Strano | A61B 5/14532 600/316 |
| 2013/0099196 | A1* | 4/2013 | Wu | H01L 21/02376 257/9 |
| 2013/0102084 | A1* | 4/2013 | Loh | B01J 21/185 436/94 |
| 2013/0193408 | A1* | 8/2013 | Hwang | H01L 33/04 257/13 |
| 2013/0214523 | A1* | 8/2013 | Kecht | C09K 11/7701 283/67 |
| 2013/0284803 | A1* | 10/2013 | Wood | G07D 7/2033 235/375 |
| 2014/0061059 | A1* | 3/2014 | Dryfe | B82Y 30/00 205/555 |
| 2014/0103226 | A1* | 4/2014 | Lopez Quintela | B41M 3/144 250/459.1 |
| 2014/0220235 | A1* | 8/2014 | Thalappil | C09K 11/025 427/64 |
| 2015/0118143 | A1* | 4/2015 | Jeon | C01B 32/194 423/448 |
| 2015/0185156 | A1* | 7/2015 | Mirkin | B42D 25/30 356/301 |
| 2015/0364545 | A1* | 12/2015 | Heo | H01L 29/1033 257/24 |
| 2016/0005894 | A1* | 1/2016 | Zhang | B82Y 40/00 257/29 |
| 2016/0059444 | A1* | 3/2016 | Wang | C01B 31/04 423/448 |
| 2016/0137508 | A1* | 5/2016 | Suh | C01B 31/0446 423/448 |
| 2016/0207345 | A1* | 7/2016 | Farmer | B42D 25/36 |
| 2016/0207775 | A1* | 7/2016 | Sundara | B82Y 30/00 |
| 2016/0258114 | A1* | 9/2016 | Firth | B82Y 20/00 |
| 2016/0351738 | A1* | 12/2016 | Choi | H01L 31/09 |
| 2017/0039793 | A1* | 2/2017 | Send | G07D 7/12 |
| 2017/0041564 | A1* | 2/2017 | Konstantatos | H01L 27/14623 |
| 2017/0076530 | A1* | 3/2017 | Kecht | G07D 7/12 |
| 2017/0091782 | A1* | 3/2017 | Nawrocki | G06Q 30/0185 |
| 2017/0152145 | A1* | 6/2017 | Tour | C09K 11/65 |
| 2017/0253069 | A1* | 9/2017 | Kerkar | B42D 25/305 |
| 2017/0271067 | A1* | 9/2017 | Raksha | H01F 10/08 |
| 2017/0355628 | A1* | 12/2017 | Moloney | B82Y 20/00 |
| 2018/0009676 | A1* | 1/2018 | Pickett | B01J 13/00 |
| 2018/0018846 | A1* | 1/2018 | Falko | G07D 7/12 |
| 2018/0286035 | A1* | 10/2018 | Kozicki | G07D 7/2033 |

OTHER PUBLICATIONS

Band diagrams of heterostructures, 2010, http://www.eng.auburn. edu/~niuguof/7760fall2010/Ch17%20Heterostructures%20Prof.% 20Schubert.pdf (Year: 2010).* https://aip.scitation.org/doi/10.1063/1.4865414 J. Chem. Phys. 140, 074304 (2014); https://doi.org/10.1063/1.4865414 Sandeep Kumar Singh M. Neek-Amal F. M. Peeters Published Online: Feb. 19, 2014 Accepted: Jan. 2014 (Year: 2014).*

EP Search Report and Opinion issued in connection with corresponding EP Application No. PCT/GB2016/050164 dated Apr. 11, 2016, 4 pages.

EP Search Report and Opinion issued in connection with corresponding EP Application No. GB1501342.8 dated Jul. 22, 2015, 3 pages.

* cited by examiner

AUTHENTICATION OF PHYSICAL ENTITIES

The present invention relates to the field of authentication of physical entities, such as currency or goods, for example using an authentication device.

There have previously been proposed many techniques for the authentication of physical entities, such as currency or goods, including, for example, the use of holographic or ultra violet watermarks as authentication marks. However, such techniques have proven to be relatively susceptible to copying, thereby negating the effect of the authentication mark and allowing counterfeit currency or goods to be passed off as authentic. Further proposed techniques have relied on authentication marks formed of materials which are difficult to source, or which are difficult to manufacture, yet these authentication marks may still be copied provided that the relevant materials can be obtained. Additionally, as manufacturing techniques at the micron scale become increasingly less expensive, many authentication marks which were previously difficult to manufacture are becoming easier to forge.

Physical unclonable functions (PUFs) are physical structures that are easy to evaluate and manufacture, but difficult to predict and duplicate, even where the manufacturing process is known. PUFs may operate using challenge-response authentication protocols. In particular, when a physical stimulus (ie a challenge) is applied to a PUF, the PUF reacts (ie responds) in an unpredictable (yet repeatable) manner due to the interaction of the stimulus with the physical structure of the PUF. Thus, the PUF can be authenticated by its response, which is a direct result of the structure of the PUF, without revealing the structure of the PUF, thereby rendering the PUF resistant to copying (ie unclonable).

Physical unclonable functions therefore provide a promising approach for the authentication of goods. However, prior art uses of PUFs for authentication of physical entities have not been entirely satisfactory, for example due to the complexity of the manufacturing and/or authentication process.

The use of a luminescence effect for security purposes is known from US 2012/168,506, which discloses methods using resonant optical modes from a range of devices, each comprising one or more three-dimensional objects. Disadvantages of such methods include the complexity of fabrication of the devices, lack of robustness, and the associated sensitivity to the environment.

There has now been provided an authentication device and a method of authentication, which overcome or substantially mitigate the aforementioned and/or other disadvantages associated with the prior art.

According to a first aspect of the present invention, there is provided an authentication device comprising one or more flakes of a substantially two-dimensional material with an operative area configured to emit, by non-resonant photoluminescence, electromagnetic radiation with a property that varies with position in the operative area.

According to a further aspect of the present invention, there is provided a method of authentication, comprising the steps of:

(a) providing an authentication device according to the invention;

(b) irradiating at least part of the operative area of the authentication device with incident electromagnetic radiation, such that electromagnetic radiation is emitted, by non-resonant photoluminescence, with a property that varies with position in the operative area;

(c) sensing the emitted electromagnetic radiation; and (d) providing an authentication map from the sensed electromagnetic radiation, which enables authentication.

According to a further aspect of the present invention, there is provided authentication apparatus comprising an authentication device according to the invention, means for irradiating at least part of the operative area of the authentication device with incident electromagnetic radiation, such that electromagnetic radiation is emitted, by non-resonant photoluminescence, with a property that varies with position in the operative area, means for sensing the emitted electromagnetic radiation, and means for providing an authentication map from the sensed electromagnetic radiation, which enables authentication.

The device, apparatus and method according to the first aspect of the present invention may be beneficial as the emitted electromagnetic radiation may provide a unique authentication map for an associated article, which may be used to verify that the article is authentic. In particular, as the emitted electromagnetic radiation is generated by non-resonant photoluminescence of the two-dimensional material, on excitation by incident electromagnetic radiation, it is the band structure of the two-dimensional material that determines the properties of the emitted electromagnetic radiation and hence the form of the authentication map. The band structure of the two-dimensional material is highly dependent on the structure of the two-dimensional material at an atomic scale, thus making the authentication map difficult, if not impossible, to replicate in a cloned device.

The use of non-resonant photoluminescence may also be beneficial as it may allow the emitted electromagnetic radiation to be easily distinguished from the incident electromagnetic radiation used to read the authentication map, thus allowing for easy and efficient detection of the at least one unique two-dimensional map for authentication of the device. Furthermore, non-resonant photoluminescence is a linear process, in that the intensity of the emitted electromagnetic radiation is linearly dependent on the intensity of the incident electromagnetic radiation, and hence relatively low intensity incident electromagnetic radiation may be used, thereby reducing the cost and complexity of the authentication process.

The use of a two-dimensional material may also be beneficial as two-dimensional materials typically have relatively weak light scattering properties. Thus, the two-dimensional material may be substantially invisible to the naked eye in normal operating conditions. This may be beneficial where the device is intended to be incorporated into an article for which appearance is important, for example valuable consumer goods. Furthermore, the intensity of the electromagnetic radiation emitted by the two-dimensional material may be sufficiently weak, and/or the range of wavelengths of the emitted electromagnetic radiation may be sufficiently narrow, such that the emitted electromagnetic radiation cannot be seen without a detector of sufficient sensitivity and/or a correct filter.

According to a further aspect of the present invention, there is provided an authentication device comprising one or more flakes of a substantially two-dimensional material with an operative area configured, on excitation by incident electromagnetic radiation, to emit electromagnetic radiation with a property that varies with position in the operative area, and differs from a corresponding property of the incident electromagnetic radiation.

According to a further aspect of the present invention, there is provided an authentication device comprising a substantially two-dimensional material with an operative area configured, on excitation by incident electromagnetic radiation, to emit electromagnetic radiation with a property that varies with position in the operative area, and with an intensity that is linearly dependent on the incident electromagnetic radiation, the substantially two-dimensional material comprising at least one flake of said material.

By "substantially two-dimensional material" is meant a material that has a thickness of a few nanometres or less, for example such that motion of electrons into, and out of, a two dimensional plane is governed by quantum mechanical effects.

By "unique" is meant one of a kind, at least to the degree where it is statistically improbable that an identical authentication map will be randomly generated.

In non-resonant photoluminescence, the substantially two-dimensional material may absorb photons of a particular wavelength, or a selection or range of wavelengths, which cause electrons to be promoted from the valence band to the conduction band. Upon relaxation of the electrons from the conduction band to the valence band, the electrons recombine with holes, causing the emission of photons that have a wavelength corresponding substantially to the energy of the band gap.

The property of the electromagnetic radiation that varies, with the position in the operative area from which the electromagnetic radiation is emitted, may be wavelength (or frequency) or polarisation, for example.

The substantially two-dimensional material may be any material having a non-zero band gap, and capable of non-resonant photoluminescence. The substantially two-dimensional material may be a direct band gap material, or may be an indirect band gap material. The two-dimensional material is most preferably a direct band gap material. The two-dimensional material may be in the solid state, and the authentication device may be a solid state device.

The wavelength of the emitted electromagnetic radiation may correspond to the band gap of the two-dimensional material, for example the photons emitted by non-resonant photoluminescence of the substantially two-dimensional material may have an energy that corresponds substantially to the band gap energy of the two dimensional material at the associated position in the operative area.

The authentication map may be provided by detecting electromagnetic radiation of a single wavelength or polarisation, or a single range of wavelengths or polarisations, to generate a binary authentication map. Alternatively, the authentication map may be provided by detecting electromagnetic radiation of a plurality of distinct wavelengths or polarisations, or a plurality of distinct ranges of wavelengths or polarisations, to generate a multi-layered authentication map.

The band gap of the two dimensional material may vary spatially across the operative area of the substantially two-dimensional material. For example, the band gap of the substantially two-dimensional material may vary due to any of: lattice imperfections, edge defects, the shape and/or size of the two-dimensional material, the geometry of the two-dimensional material, and the interaction of the two-dimensional material with other layers of the device. The spatial variation of the band gap may thereby result in the generation of a complex authentication map, thereby increasing the resistance of the device to cloning.

The band gap of the substantially two-dimensional material may be in the range of 0 eV to 4 eV. The band gap of the substantially two-dimensional material may vary across the material between 0 eV and 4 eV. Thus, the two-dimensional material may emit electromagnetic radiation in the visible or infrared spectrum.

The substantially two-dimensional material may be configured to emit electromagnetic radiation that provides a plurality of different authentication maps, depending on the wavelength, or range of wavelengths, of the incident electromagnetic radiation. The plurality of different authentication maps may be used to increase the complexity of the authentication device, thereby rendering the device less vulnerable to cloning. For example, authentication maps of different wavelengths may be combined to create a more complex authentication map.

The substantially two-dimensional material may be doped with impurities, which may alter the band gap in certain regions of the operative area of the substantially two-dimensional material. This may thus increase the complexity of the authentication map provided by the substantially two-dimensional material.

The substantially two-dimensional material may comprise a single sheet of material, or may, for example, comprise a plurality of flakes of material. Where the substantially two-dimensional material comprises a plurality of flakes of material, the plurality of flakes may be easier to manufacture than a single sheet, and may thus reduce manufacturing costs. The plurality of flakes of substantially two-dimensional material may be incorporated into the device by suspending the flakes in a solvent, and then allowing the solvent to evaporate.

The authentication map provided by the emitted electromagnetic radiation may be an analogue signal. The authentication map may be convertible into a digital, ie binary, signal. The analogue to digital conversion may be achieved by any conventional means, for example by reducing the resolution of the analogue signal in order to produce an array of 1-bit, or multi-bit, values.

The authentication map may be readable by an authentication reader, thus allowing for authentication of the device. The authentication reader may be any apparatus capable of sensing the electromagnetic radiation emitted from a plurality of positions in the operative area. The authentication reader may also include a source of electromagnetic radiation, eg for providing the incident electromagnetic radiation. The authentication reader may also include processing means, eg a microprocessor, for generating the authentication map or an associated digital signature from the sensed electromagnetic radiation.

The authentication reader may comprise means for sensing the electromagnetic radiation emitted from a plurality of positions in the operative area, and means for generating an authentication map from the sensed electromagnetic radiation. For example, the authentication reader may comprise an image sensor, eg a charge-coupled device (CCD) image sensor. It is also recognised that more complex authentication readers, such as spectrometers may be used, where appropriate.

The authentication reader may be configured to compare the at least one read authentication map to a database of authentic maps, which may be accessible remotely, eg using the internet. This comparison may enable authentication of the device. Alternatively, the authentication reader may be configured for authentication without access to a database of authentic maps.

The authentication reader may have a tolerance for minor variations in the emitted electromagnetic radiation, while reading the same authentication map. These variations may be caused, for example, by interaction of the substantially two-dimensional material with the external environment over time.

The authentication reader may be configured to read the majority or all of the authentication map in parallel, and take a single reading. Alternatively, the authentication reader may be configured to read only a portion of the authentication map at a time, and take multiple readings. The authentication reader may be configured to scan across the authentication map over a period of time in order to take multiple readings.

The resolution of the means for sensing the emitted electromagnetic radiation may determine the bit depth of the digital signal of the authentication map. The digital signal is preferably at least a 128 bit key, at least a 256 bit key, or at least a 512 bit key. The authentication reader may have, and most preferably has, a pixel array of at least 64×64 pixels.

The authentication reader may comprise one or more filters, which may each be configured to allow the passage of a single wavelength or polarisation, or a narrow range of wavelengths or polarisations, of electromagnetic radiation. Thus, the authentication reader may be configured to read only a single authentication map at a single wavelength or polarisation, or a narrow range of wavelengths or polarisations, or a plurality of authentication maps, at a plurality of distinct wavelengths or polarisations, or a plurality of distinct narrow ranges of wavelengths or polarisations, as desired. The one or more filters may be configured to prevent the passage of the incident electromagnetic radiation used to irradiate the operative area of the substantially two-dimensional material.

Where a polarisation filter is used, a plurality of authentication maps may be read by the authentication reader at a single wavelength, or a single narrow range of wavelengths. The authentication reader may be configured to sense circular polarisation. Thus, the authentication reader may be orientated independently of the orientation of the authentication device.

The authentication device may optionally comprise at least one registration mark for facilitating determination of the authentication map. For example, the registration mark may provide information that facilitates determination of the authentication map, such as information regarding the orientation of a polarisation of the authentication map.

The electromagnetic radiation used to irradiate the operative area of the substantially two-dimensional material may have a photon energy that is at least as high as, and most preferably higher than, the energy of the band gap of the substantially two dimensional material in at least part of the operative area. The photons of the incident electromagnetic radiation may be coherent, or may be non-coherent. The photons may be produced by any appropriate light source, and may, for example, be produced by an LED or a laser light source. Different light sources may be used to generate a plurality of authentication maps. For example, laser light sources having differing wavelengths may be used to produce emitted electromagnetic radiation in a plurality of different ranges of wavelengths, thereby enabling a plurality of authentication maps to be read. The light source may be, for example, a 2 eV green laser light source.

The substantially two-dimensional material may be encapsulated within, or laminated by, at least one layer of an optically transmissive, eg transparent, material. The optically transmissive material may have a higher rigidity than the substantially two-dimensional material. Thus, the substantially two-dimensional material may be protected from ambient surroundings, whilst still being able to be used to emit electromagnetic radiation that provides an authentication map. The optically transmissive material may have substantially the same rigidity as the remainder of the device and the article to which the device is applied, and may thereby be easily incorporated into the structure of the article, without inhibiting the function of the device.

The optically transmissive material may reduce the risk that the band gap of the substantially two-dimensional material will change over time. For example, the optically transmissive material may prevent other atoms and/or molecules from binding to the surface of the substantially two-dimensional material. The optically transmissive material may be, and in preferred embodiments is, substantially impermeable to water.

The authentication device, or the article to which the authentication device is applied, may comprise a further authentication mark, for example a bar code or QR code. The further authentication mark may be derived from the authentication map provided by the emitted electromagnetic radiation of the operative area of the substantially two-dimensional material, eg using a secret component of a cryptographic key or signature. For example, the authentication map may be encrypted using a secret component of a cryptographic key or signature in order to produce the further authentication mark, such that reading of both the further authentication mark and the authentication map provides a key that may be authenticated by comparison with a public component of the cryptographic key or signature. Hence, knowledge of a public component of the cryptographic key or signature, together with a reading of both the further authentication mark and the authentication map, would enable the authentication device, or the article to which the authentication device is applied, to be authenticated. The introduction of a further identification mark may introduce an additional level of security associated with the authentication of the device, or the article to which the authentication device is applied, to be authenticated. Furthermore, the further identification mark may allow for off-line authentication of the device, eg without need for access to a database of authentic authorisation maps, thus allowing authentication to be performed inexpensively and remotely from an internet connection.

The substantially two-dimensional material may be any such material having a bandgap, or any material in which a band gap may be induced via doping, strain, morphology or the like. The substantially two-dimensional material may be a semiconductor. The substantially two-dimensional material may be, for example, any, or any combination of graphene oxide, graphene, silicene, germanene, or phosphorene. The substantially two dimensional material may be, for example, any, or any combination of, transition metal dichalcogenides, for example, molybdenum disulphide, molybdenum diselenide, tungsten disulphide, or tungsten diselenide. The substantially two-dimensional material may be, for example, any, or any combination of, group III-chalcogenides, for example $Ga_2X_2$ or $In_2X_2$, where X=S, Se, or Te.

The authentication device may form part of, or be integrated with, an article for which authentication is desired, eg an article of value. The article may be any physical entity for which authentication is desired, and may be, for example, a bank note or the like.

According to a further aspect of the present invention, there is provided an article comprising an authentication device as described above.

The authentication device may be formed integrally with the article, eg formed in the same manufacturing process, or may be applied following manufacture of the article.

The operative area of the authentication device may be exposed, or able to be exposed, to enable irradiation by incident electromagnetic radiation, eg of the authentication reader. The operative area of the authentication device may be covered, however, by an optically transmissive material.

The article may be a final good, ie goods purchased by the end user, eg consumer goods purchased by households, or capital goods, such as machinery, purchased by companies. The article may be a data carrier. The article may be currency, eg a bank note, or a bank card.

The authentication device may be sufficiently small to be inconspicuous on the article, or even invisible to the naked eye. This may be particularly advantageous for goods for which appearance is important, for example valuable consumer goods. The authentication device may therefore have a maximum cross-sectional area or an operative area of less than $10^{-4}$ m$^2$ (1 cm$^2$), less than $10^{-6}$ m$^2$ (1 mm$^2$), less than $10^{-8}$ m$^2$, or less than $10^{-9}$ m$^2$. It is thought that the minimum operative area would be of the order of $10^{-10}$ m$^2$, eg of the order of 10×10 µm, although it is believed that expensive optics would be required to read such a small operative area. For those articles that need to be robust and resist wear and tear, such as currency, eg bank notes, or a bank card, the authentication device may be larger, and may therefore have a maximum cross-sectional area or an operative area of at least 1 mm$^2$, at least 10 mm$^2$ or at least 30 mm$^2$, eg around 1 cm$^2$.

The emitted electromagnetic radiation may be substantially invisible to the naked eye. The emitted electromagnetic radiation may have an intensity which is sufficiently low such that the electromagnetic radiation may be substantially invisible to the naked eye. The emitted electromagnetic radiation may have a wavelength and/or a narrow range of wavelengths such that the electromagnetic radiation may be substantially invisible to the naked eye.

According to a further aspect of the invention, there is provided a method of manufacturing an article, the method including the step of incorporating an authentication device as described above into the article.

The authentication device may be formed during manufacture of the article. However, in presently preferred embodiments, the authentication device is manufactured separately from the article, and the method of manufacturing the article includes the step of fixing the authentication device to the article.

The step of fixing the authentication device to the article may be an integral step in the formation of the article, for example the authentication device may be embedded in a surface of the article. Alternatively, the authentication device may be fixed to a surface of the article following formation of the article.

Any preferential features of the aspects of the present invention may be applied to other aspects of the present invention, where appropriate.

A practicable embodiment of the invention is described in further detail below with reference to the accompanying drawings, of which:

Figure 1:
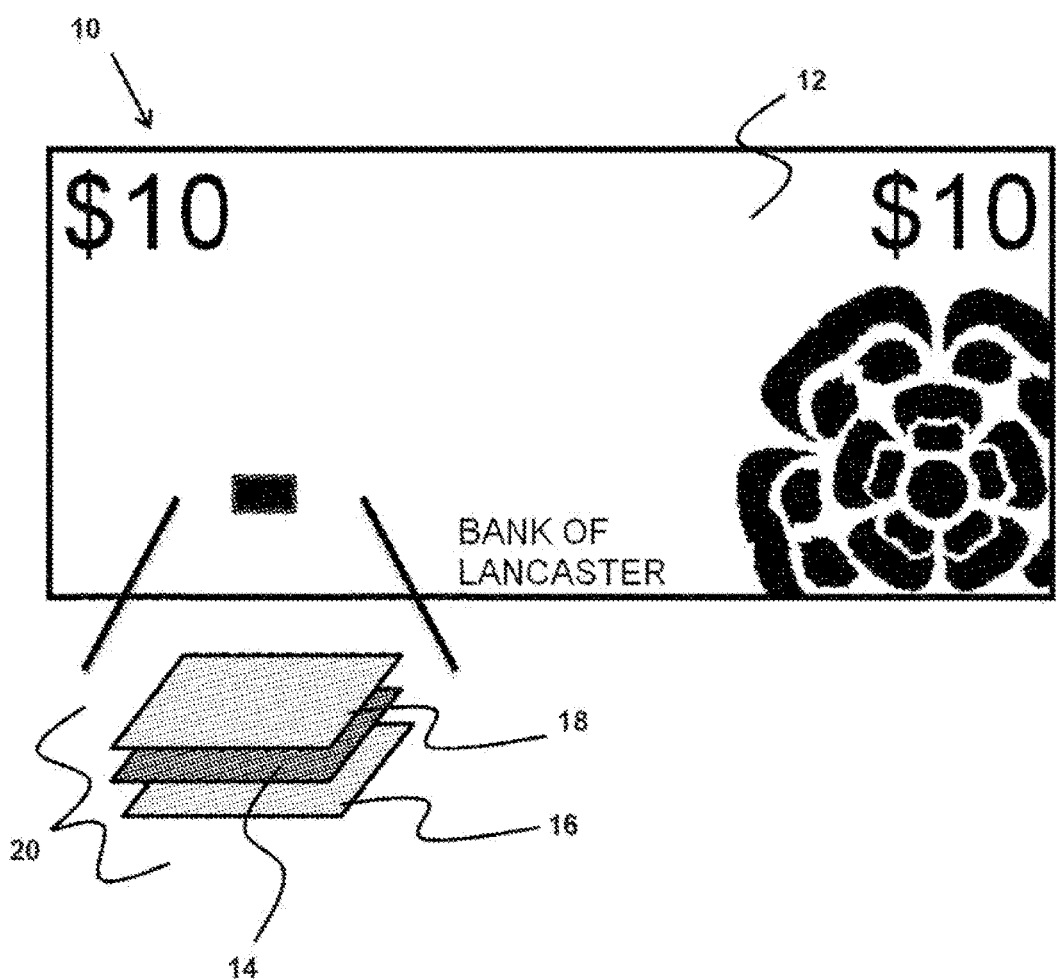
FIG. 1 is a schematic view of a first embodiment of an authentication device and associated article according to the invention.

An article 10 including an authentication device 20 according to the invention is shown in FIG. 1. Whilst the article 10 is represented here as a banknote, it will be recognised that the scope of the invention encompasses any article for which authentication is required.

The article 10 comprises a main body 12 having the form of a banknote, and the authentication device 20 includes a substantially two-dimensional material 14, and two optically transparent layers 16,18. The main body 12 of the article 10 is a typical banknote, such as those currently in circulation in the United Kingdom, along with those in circulation in many other territories worldwide. The substantially two-dimensional material 14 is an atom thick lattice of any material having a band gap, whether the band gap is either inherent or induced via doping and the like.

In presently preferred embodiments, the substantially two-dimensional material is graphene oxide. Graphene oxide represents a good choice for the two-dimensional material as the band gap of graphene oxide is very sensitive to any of lattice imperfections, edge defects, the shape and/or size of the two-dimensional material, the geometry of the two-dimensional material, and the interaction of the two-dimensional material with other layers. Thus, graphene oxide has a band gap which varies spatially across the two-dimensional material 14 in a random and uncontrollable manner, thereby allowing the generation of a unique non-resonant photoluminescence map upon irradiation of the two-dimensional material by electromagnetic radiation. Furthermore, the band gap of graphene oxide varies between 0-2 eV, thereby overlapping both the near infra-red and visible spectrum. This may be beneficial as it may allow for the use of relatively cheap CCDs and filters for authentication of the article 10.

The graphene oxide may be produced by any conventional means. Whilst the two-dimensional material 14 is shown as a single sheet in FIG. 1, it will also be recognised that the two-dimensional material 14 may comprise a plurality of flakes of two-dimensional material.

The two optically transparent layers 16,18 may be formed of any optically transparent material (ie material that allows the passage of electromagnetic radiation), and are typically substantially the same length and width as, if not larger than, the length and width of the two-dimensional material 14. The optically transparent layers 16,18 are formed of a material which is substantially more rigid than the two-dimensional material 14, and may thus provide a support structure for the two-dimensional material 14. The optically transparent layers 16,18 also have a thickness which is greater than the thickness of the two-dimensional material 14. In presently preferred embodiments, the optically transparent layers 16,18 comprise an inner layer of boron nitride and an outer layer of plastics material.

The two-dimensional material 14 is encapsulated within the optically transparent layers 16,18 to form the authentication device 20. The authentication device 20 is incorporated into the main body 12 of the article 10.

Figure 2:
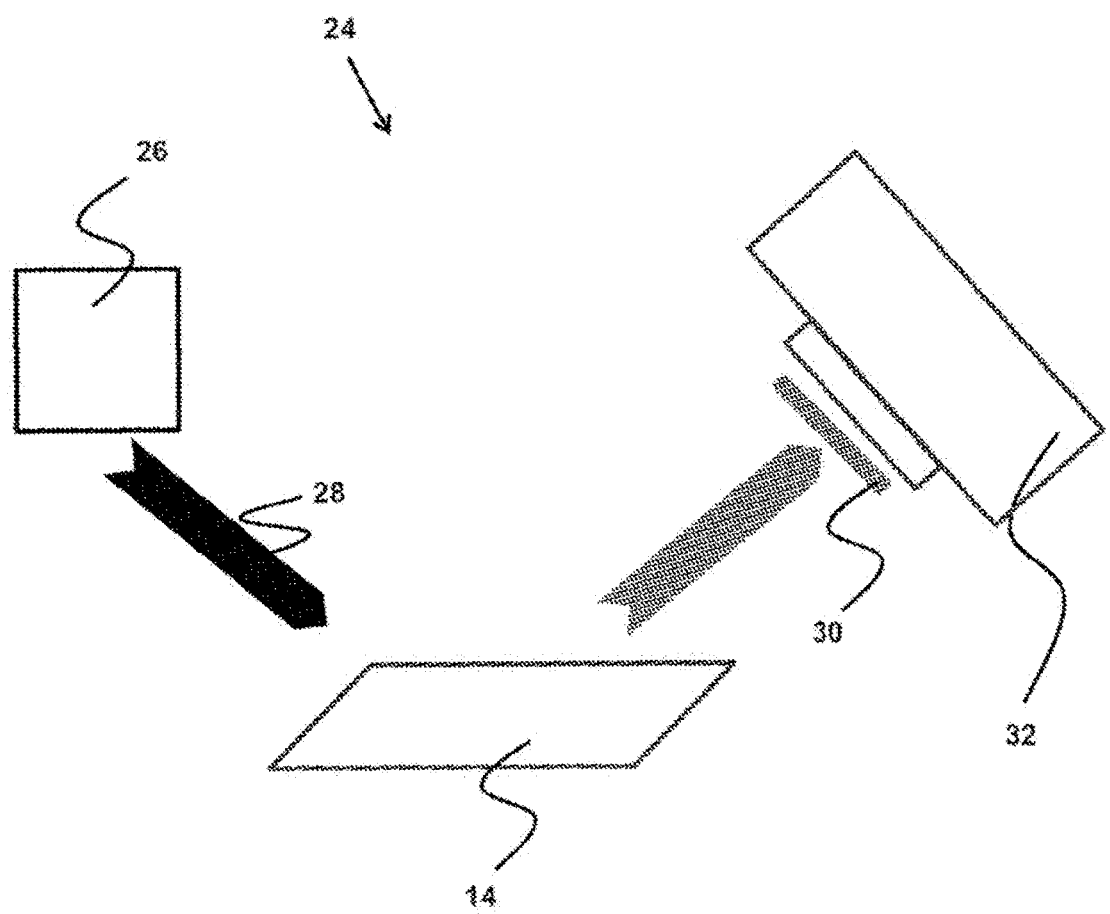
FIG. 2 is a schematic view of an authentication reader configured to read the authentication device of FIG. 1.

An authentication reader 24 configured to read the authentication device 20 of FIG. 1 is shown in FIG. 2. The apparatus comprises a light source 26 which is configured to produce electromagnetic radiation 28, in the form of light, for irradiating the two-dimensional material 14, and a sensor 32 for sensing the unique non-resonant photoluminescence map generated by the two-dimensional material 14.

The light source 26 may be any light source that has an energy sufficient to cause excitation of electrons from the valence band to the conduction band in the two-dimensional material 14. In presently preferred embodiments, the light source 26 is a laser light source which is chosen to have a wavelength corresponding substantially to the band gap energy of graphene oxide. In particular, the light source 26 in presently preferred embodiments is a green laser with an energy in the range of 2 eV.

The sensor 32 is any sensor that is capable of sensing the unique non-resonant photoluminescence map generated by the two-dimensional material 14. In presently preferred embodiments, the sensor 32 is a silicon CCD. The resolution of the CCD 32 must be sufficient to sense the unique non-resonant photoluminescence map generated by the two-dimensional material 14, and in presently preferred embodiments the CCD 32 has a resolution of at least 64×64 pixels. This may enable the unique non-resonant photoluminescence map generated by the two-dimensional material 14 to provide at least a 512 bit key.

The apparatus 24 optionally comprises a filter 30. The filter 30 may be chosen to allow only the passage of light of a wavelength corresponding substantially to the band gap of the two-dimensional material 14. Thus the unique non-resonant photoluminescent map generated by the two-dimensional material 14 may be easily and efficiently identified and separated from the light 28 used to irradiate the two-dimensional material 14.

When it is desired to authenticate an article 10 comprising the two-dimensional material 14, the light source 26 is used to irradiate the two-dimensional material 14 of the authentication device 20 with light 28. In presently preferred embodiments, the entirety of a visible surface of the two-dimensional material 14 is simultaneously irradiated with light 28, although it is recognised that scanning of at least a portion of the two-dimensional material 14 by the light 28 may also be used where appropriate.

For clarity, FIG. 2 shows light source 26 and sensor 32 as physically separated, but in practice they may be incorporated into a single physical device, The light 28 causes electrons in the valence band of the two-dimensional material 14 to be excited into the conduction band. The excited electrons quickly relax and subsequently recombine with holes in the valence band, thereby causing the emission of photons that each have an energy close to the energy of the band gap in the region of the two-dimensional material 14 where recombination occurred. As the band gap varies spatially across the two-dimensional material 14, photons of differing wavelengths are emitted by different regions of the two-dimensional material 14, thereby causing a photoluminescent map (or 2D spectra) to be generated. As the structure of the two-dimensional material 14, and thus the band gap, varies on an atomic level, the map can be said to be unique, as it is statistically improbable that an identical map will be randomly generated.

Figure 3:
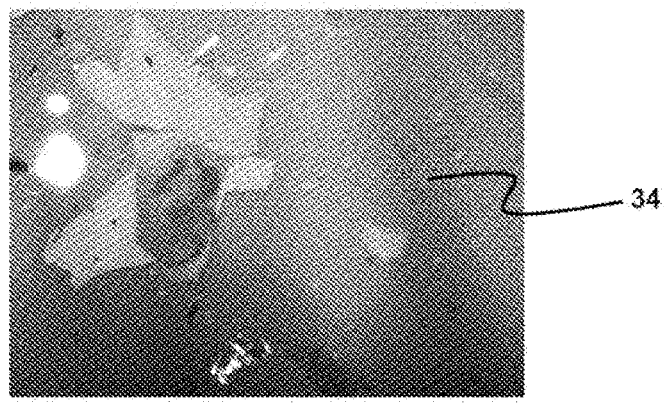
FIG. 3 is a schematic view of the atomic structure of a two-dimensional material of the device of FIG. 1.
Figure 4:
FIG. 4 is a schematic view of an authentication map generated by the two-dimensional material of FIG. 3.

An exemplary structure 34 of the two-dimensional material 14 is shown in FIG. 3, with the corresponding map 36 shown in FIG. 4.

The photoluminescence map 36 generated by the two-dimensional material 14 is read by the sensor 32, and is then compared to a database of authentic maps in order to authenticate the article 10.

It will be understood that the database of authentic maps is updated by the manufacturer at the time of manufacture of each article 10 or fitting of security device 20

Figure 5:
FIG. 5 is a schematic view of a digitised version of the authentication map of FIG. 4.

As can be seen from FIG. 4, the map 36 is an analogue signal and, in presently preferred embodiments, the map 36 is reduced in resolution to generate a digital signature 38 as shown in FIG. 5. The digital signature 38 may be compared to a database of authentic signals, as opposed to comparing the map 36 to a database of authentic maps, in order to authenticate the article 10. This may be beneficial as the digital signature 38 may have greater tolerance to variation in the map 36, which may, for example, be caused by alteration of the two-dimensional material 14 due to interaction with the environment over time.

Figure 6:
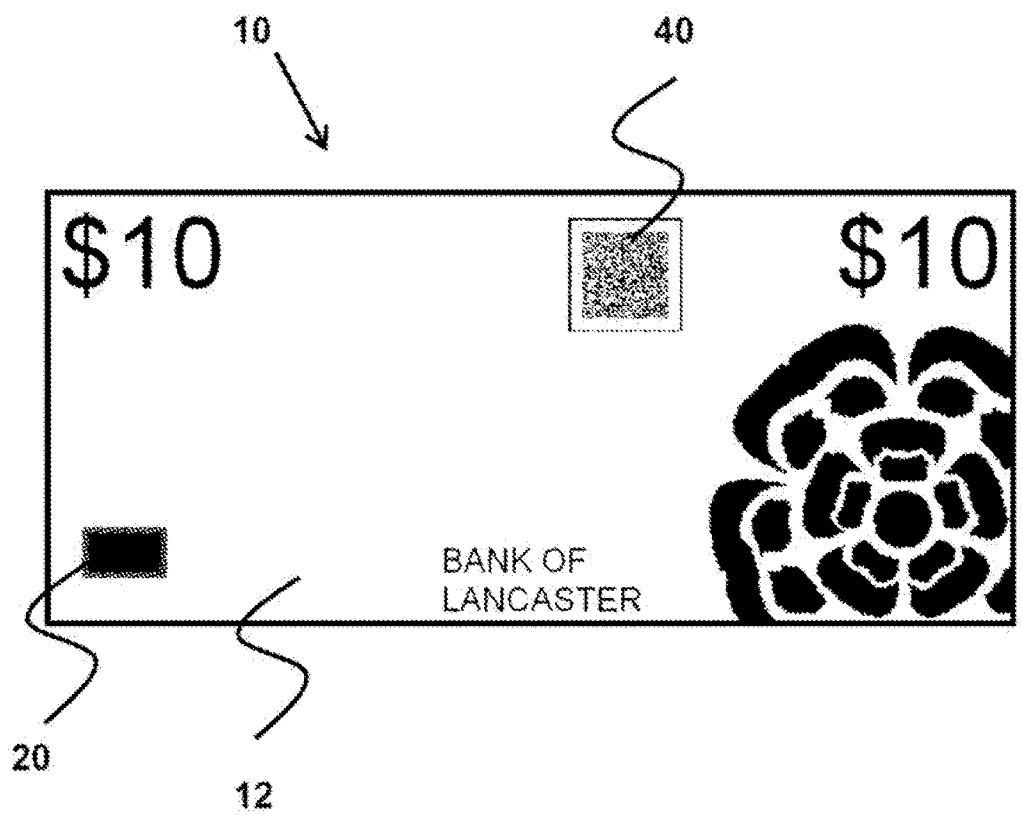
FIG. 6 is a schematic view of a second embodiment of a device and associated article according to the invention.

A second embodiment of a device 20 and associated article 10 according to the invention is shown in FIG. 6. The second embodiment is identical to the first embodiment, except only in that the second embodiment of the article 10 comprises a further authentication mark 40 in the form of a QR code. Whilst the further authentication mark 40 has been depicted as a QR code in FIG. 6, it will be recognised that other forms of authentication mark or identification mark, such as barcodes, may also be used.

In order to produce the QR code 40, the map 36 is combined with a secret cryptographic key, and the resultant QR code 40 is printed onto the article 10 at the time of manufacture and/or fitting of the authentication device 20. The QR code 40 can then be read alongside, or in combination with, the map 36 or digital signature 38. A public component of the cryptographic key can be used to correlate the information stored in the QR code 40 with the map 36 generated by the two-dimensional material 14, thereby authenticating the article 10. The second embodiment of the present invention may be beneficial as it may allow for offline authentication of the article 10, eg using a public component of the cryptographic key, thereby removing the need for an internet connection in order to authenticate the article 10.

The invention claimed is:

1. An authentication device comprising a plurality of flakes of a substantially two-dimensional material, each flake having with an operative area configured to emit, by nonresonant photoluminescence, electromagnetic radiation with a property that varies with position in the operative area, as a result of a band gap of the substantially two-dimensional material varying spatially across the operative area of each flake, and the band gap of the substantially two-dimensional material varying between flakes of the substantially two-dimensional material, such that each flake of the plurality of flakes has a different variation in the property, wherein each flake of the substantially two-dimensional material is sized such that motion of electrons into, and out of, a two dimensional plane of the material is governed by quantum mechanical effects, wherein the optical property is one of polarization or wavelength, and wherein the operative area of each flake is sized to permit optical detection of the property across the operative area.

2. An authentication device as claimed in claim 1, wherein the property of the electromagnetic radiation that varies, with the position in the operative area from which the electromagnetic radiation is emitted, is wavelength.

3. An authentication device as claimed in claim 1, wherein the property of the electromagnetic radiation that varies, with the position in the operative area from which the electromagnetic radiation is emitted, is polarisation.

4. An authentication device as claimed in claim 1, wherein the emitted electromagnetic radiation has a wavelength that differs from a wavelength of incident electromagnetic radiation.

5. An authentication device as claimed in claim 1, wherein the electromagnetic radiation emitted from the operative area has an intensity that is linearly dependent on the incident electromagnetic radiation.

6. An authentication device as claimed in claim 1, wherein the two-dimensional material is a direct band gap material.

7. An authentication device as claimed in claim 1, wherein the photons emitted by non-resonant photoluminescence of the substantially two-dimensional material have an energy that corresponds substantially to the band gap energy of the two dimensional material at the associated position in the operative area.

8. An authentication device as claimed in claim 1, wherein the band gap of the substantially two-dimensional material varies due to any of: lattice imperfections, edge defects, the shape and/or size of the two-dimensional material, the geometry of the two-dimensional material, and the interaction of the two-dimensional material with other layers of the device.

9. An authentication device as claimed in claim 1, wherein the band gap of the substantially two-dimensional material varies across the material, within the range 0 eV and 4 eV.

10. An authentication device as claimed in claim 1, wherein the substantially two-dimensional material emits electromagnetic radiation in the visible spectrum.

11. An authentication device as claimed in claim 1, wherein the substantially two-dimensional material is doped with impurities, which alter the band gap in certain regions of the operative area of the substantially two-dimensional material.

12. An authentication device as claimed in claim 1, wherein the substantially two-dimensional material comprises a plurality of flakes of said material.

13. An authentication device as claimed in claim 1, wherein the substantially two-dimensional material is encapsulated within, or laminated by, at least one layer of an optically transmissive, eg transparent, material.

14. An authentication device as claimed in claim 13, wherein the optically transmissive material has a higher rigidity than the substantially two-dimensional material.

15. An authentication device as claimed in claim 1, wherein the substantially two-dimensional material is any one of, or any combination of: graphene oxide, graphene and phosphorene.

16. An authentication device as claimed in claim 1, wherein the substantially two dimensional material is any one of, or any combination of, transition metal dichalcogenides, for example, molybdenum disulphide, molybdenum diselenide, tungsten disulphide and tungsten diselenide.

17. An authentication device as claimed in claim 1, wherein the substantially two dimensional material is any one of, or any combination of, group 111-chalcogenides, for example $Ga_2X_2$ or $In_2X_2$, where X=S, Se, or Te.

18. An authentication device as claimed in claim 1, wherein the authentication device forms part of, or is integrated with, an article for which authentication is desired.

19. An article comprising an authentication device as claimed in claim 1.

20. An article as claimed in claim 19, wherein the article comprises a further authentication mark, for example a bar code or QR code.

21. An article as claimed in claim 20, wherein the further authentication mark is derived from an authentication map provided by the emitted electromagnetic radiation of the operative area of the substantially two-dimensional material, eg using a secret component of a cryptographic key or signature.

22. An article as claimed in claim 21, wherein the authentication map is encrypted using a secret component of a cryptographic key or signature in order to produce the further authentication mark, such that reading of both the further authentication mark and the authentication map provides a key that may be authenticated by comparison with a public component of the cryptographic key or signature.

23. An article as claimed in claim 19, wherein the article is a final good, a data carrier, currency or a bank card.

24. A method of authentication, comprising the steps of:
 (a) providing an authentication device according to claim 1;
 (b) irradiating at least part of the operative area of the authentication device with incident electromagnetic radiation, such that electromagnetic radiation is emitted, by non-resonant photoluminescence, with a property that varies with position in the operative area;
 (c) sensing the emitted electromagnetic radiation;
 (d) providing an authentication map from the sensed electromagnetic radiation; and
 (e) verifying the authentication map.

25. A method as claimed in claim 24, wherein the verifying includes submitting the authentication map an authentication reader, which includes a source of electromagnetic radiation, a sensor for sensing the electromagnetic radiation emitted from a plurality of positions in the operative area, and a processor for generating the authentication map and/or an associated digital signature from the sensed electromagnetic radiation.

26. A method as claimed in claim 24, wherein the electromagnetic radiation used to irradiate the operative area of the substantially two-dimensional material has a photon energy that is at least as high as, and most preferably higher than, the energy of the band gap of the substantially two dimensional material in at least part of the operative area.

27. A method as claimed in claim 24, wherein the authentication map is provided by detecting electromagnetic radiation of a plurality of distinct wavelengths or polarisations, or a plurality of distinct ranges of wavelengths or polarisations, to generate a multi-layered authentication map.

28. A method as claimed in claim 24, wherein the authentication map is converted into a digital signal.

29. A method as claimed in claim 24, wherein the authentication map is compared to a database of authentication maps.

30. A method as claimed in claim 24, wherein the database of authentication maps is accessed remotely.

31. Authentication apparatus comprising an authentication device according to claim 1, means for irradiating at least part of the operative area of the authentication device with incident electromagnetic radiation, such that electromagnetic radiation is emitted by non-resonant photoluminescence with a property that varies with position in the operative area, means for sensing the emitted electromagnetic radiation, and means for providing an authentication map from the sensed electromagnetic radiation, which enables authentication via an authentication reader.

32. Authentication apparatus as claimed in claim 31, wherein the authentication map is readable by an authentication reader, which includes a source of electromagnetic radiation, a sensor for sensing the electromagnetic radiation emitted from a plurality of positions in the operative area, and a processor for generating the authentication map and/or an associated digital signature from the sensed electromagnetic radiation.

33. Authentication apparatus as claimed in claim 31, wherein the electromagnetic radiation used to irradiate the operative area of the substantially two-dimensional material has a photon energy that is at least as high as the energy of the band gap of the substantially two dimensional material in at least part of the operative area.

34. Authentication apparatus as claimed in claim 31, wherein the authentication apparatus comprises one or more filters, which are each configured to allow the passage of a single wavelength or polarisation, or a narrow range of wavelengths or polarisations, of electromagnetic radiation.

35. Authentication apparatus as claimed in claim 34, wherein the one or more filters are configured to prevent the passage of the incident electromagnetic radiation used to irradiate the operative area of the substantially two-dimensional material.

36. Authentication apparatus as claimed in claim 31, wherein the authentication map is provided by detecting electromagnetic radiation of a plurality of distinct wavelengths or polarisations, or a plurality of distinct ranges of wavelengths or polarisations, to generate a multi-layered authentication map.

37. Authentication apparatus as claimed in claim 31, wherein a plurality of authentication maps are readable by the authentication reader at a single wavelength, or a single narrow range of wavelengths.

38. Authentication apparatus as claimed in claim 31, wherein the authentication apparatus comprises a charge-coupled device (CCD) image sensor.

39. Authentication apparatus as claimed in claim 31, wherein the authentication map is converted into a digital signal.

40. Authentication apparatus as claimed in claim 31, wherein the apparatus is configured to compare the at least one read authentication map to a database of authentication maps.

41. Authentication apparatus as claimed in claim 31, wherein the database of authentication maps is accessible remotely.

42. A method of manufacturing an article, the method including the step of incorporating an authentication device according to claim 1 into the article.

43. A method as claimed in claim 42, wherein the authentication device is manufactured separately from the article, and the method of manufacturing the article includes the step of fixing the authentication device to the article.

44. A method as claimed in claim 42, wherein the step of fixing the authentication device to the article is an integral step in the formation of the article, or the authentication device is fixed to a surface of the article following formation of the article.

45. An authentication device as claimed in claim 1, wherein each flake of the substantially two-dimensional material includes a plurality of atoms within the operative area.

46. An authentication device as claimed in claim 1, wherein each flake of the substantially two-dimensional material includes a plurality of atoms distributed across the operative area in two dimensions.

* * * * *